United States Patent
Thomas

(10) Patent No.: US 8,195,947 B2
(45) Date of Patent: Jun. 5, 2012

(54) METHOD AND SYSTEM FOR CONVEYING ALTERNATE ACCEPTABLE CANONICALIZATIONS OF A DIGITALLY SIGNED PIECE OF ELECTRONIC MAIL

(75) Inventor: Michael Thomas, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 1382 days.

(21) Appl. No.: 10/986,268

(22) Filed: Nov. 10, 2004

(65) Prior Publication Data

US 2006/0101271 A1    May 11, 2006

(51) Int. Cl.
*H04L 29/06* (2006.01)
(52) U.S. Cl. .................................................... 713/180
(58) Field of Classification Search .................. 713/150, 713/165, 168, 176–177, 180, 189; 711/216; 705/50–51, 62, 57–59, 67, 75–76, 44; 726/2–5, 726/21, 30; 382/100, 232, 119; 358/3.28; 380/54, 229, 241
See application file for complete search history.

(56) References Cited

U.S. PATENT DOCUMENTS

| | | | |
|---|---|---|---|
| 6,549,957 B1 * | 4/2003 | Hanson et al. | 710/5 |
| 6,959,288 B1 * | 10/2005 | Medina et al. | 705/51 |
| 7,076,661 B2 | 7/2006 | Chen et al. | |
| 7,079,654 B1 | 7/2006 | Remery et al. | |
| 7,131,108 B1 * | 10/2006 | Tang et al. | 717/107 |
| 7,174,460 B2 * | 2/2007 | Horita et al. | 713/176 |
| 7,206,814 B2 * | 4/2007 | Kirsch | 709/206 |
| 7,254,712 B2 * | 8/2007 | Godfrey et al. | 713/176 |
| 7,309,004 B1 * | 12/2007 | Muschellack et al. | 235/379 |
| 7,313,251 B2 * | 12/2007 | Rhoads | 382/100 |
| 7,346,655 B2 * | 3/2008 | Donoho et al. | 709/204 |
| 7,660,844 B2 * | 2/2010 | Takase et al. | 709/203 |

OTHER PUBLICATIONS

Xml.coverpages.org, "Public Review Draft for the Java XML Digital Signature API Specification," 4 pages total, Jun. 3, 2003, www.xml.coverpages.org/ni2003-06-03-a.html.

\* cited by examiner

*Primary Examiner* — Kim Vu
*Assistant Examiner* — Leynna Truvan
(74) *Attorney, Agent, or Firm* — Stolowitz Ford Cowger LLP

(57) ABSTRACT

Methods and systems for sending a digitally signed electronic mail (email) comprising a message are described. A first canonicalization of a first version of the message is generated. A second canonicalization of a second version of the message is also generated. A single digital signature that includes both the first and second canonicalizations is generated. The digital signature is then sent with the message.

24 Claims, 6 Drawing Sheets

METHOD AND SYSTEM FOR CONVEYING ALTERNATE ACCEPTABLE CANONICALIZATIONS OF A DIGITALLY SIGNED PIECE OF ELECTRONIC MAIL

FIELD OF THE INVENTION

Embodiments of the present invention relate to transmitting and receiving electronic mail (email).

BACKGROUND OF THE INVENTION

A sender of a piece of email may for various reasons desire to digitally sign the message to establish and guarantee the authenticity of the email. A typical way of signing a message is to run a secure one-way hash over the data (or some subset of the data). The hash of the message is called a message digest. The combination of the message digest and information regarding the hashing method used is referred to herein as a canonicalization. The message digest is then encrypted; the encrypted message digest constitutes the digital signature. The message and the message digest are both sent to the receiver.

When a digitally signed piece of email is received, the receiving system decrypts the message digest. Using the same hashing method employed by the sending system, the receiving system hashes the message as received to recreate the message digest. If the resulting hash matches the message digest received in the email, the authenticity is established. If the resulting hash does not match the message digest received in the email, the authenticity of the email is not established.

There are many reasons why the hash created by the receiving system may not match the hash created by the sending system. There may be fraud involved, or there may be a more innocent and harmless explanation. Email today goes through any number of intermediate mail transfer agents on its path between the sender and the receiver of the mail. Some of these intermediaries may transform the contents of the email. For example, an intermediary may add or delete blank lines within the email. Typically, the addition of deletion of blank lines would be considered an acceptable transformation. However, because the transformed version of the message is used as the basis for recreating the message digest, the recreated message digest will not match the message digest received in the message. Under these circumstances, the email cannot be authenticated, even when acceptable message transformations are innocently introduced during the normal course of transmitting an email.

The objective of secure message transmission is to have a way of establishing and guaranteeing the authenticity of email messages that is rigid enough to filter out fraud and other undesirable transformations and flexible enough to allow harmless transformations that may be performed along the delivery path.

One known method of reducing the digital signature failure rate is to generate and transmit multiple digital signatures with an email. A digital signature is generated based on the original message, and other digital signatures are generated presuming certain types of transformations may occur during the delivery of the email. For example, one digital signature may be based on a message in which blank lines are deleted, another digital signature may be based on a message in which all white space is removed, and so on. In this way, multiple acceptable transformations of the contents of the email can be conveyed to the receiver. However, this method is undesirable because the generation of a separate signature for each acceptable version of the message is computationally expensive and requires more data to be created, transmitted and stored.

SUMMARY OF THE INVENTION

Embodiments of the present invention, a method and system for conveying multiple canonicalizations of the contents of an email message, are presented. Any number of canonicalizations are generated based on the original contents of a piece of email. Each canonicalization bears a message digest based on a variation of the original contents, along with an indication as to what hashing method was used to create the message digest. The multiple canonicalizations are concatenated or otherwise combined to form a single digital signature. The digital signature bearing multiple acceptable canonicalizations is transmitted along with the piece of email. The receiver extracts the multiple canonicalizations from the signature upon receiving the email and uses them to determine the authenticity of the contents of the piece of email.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
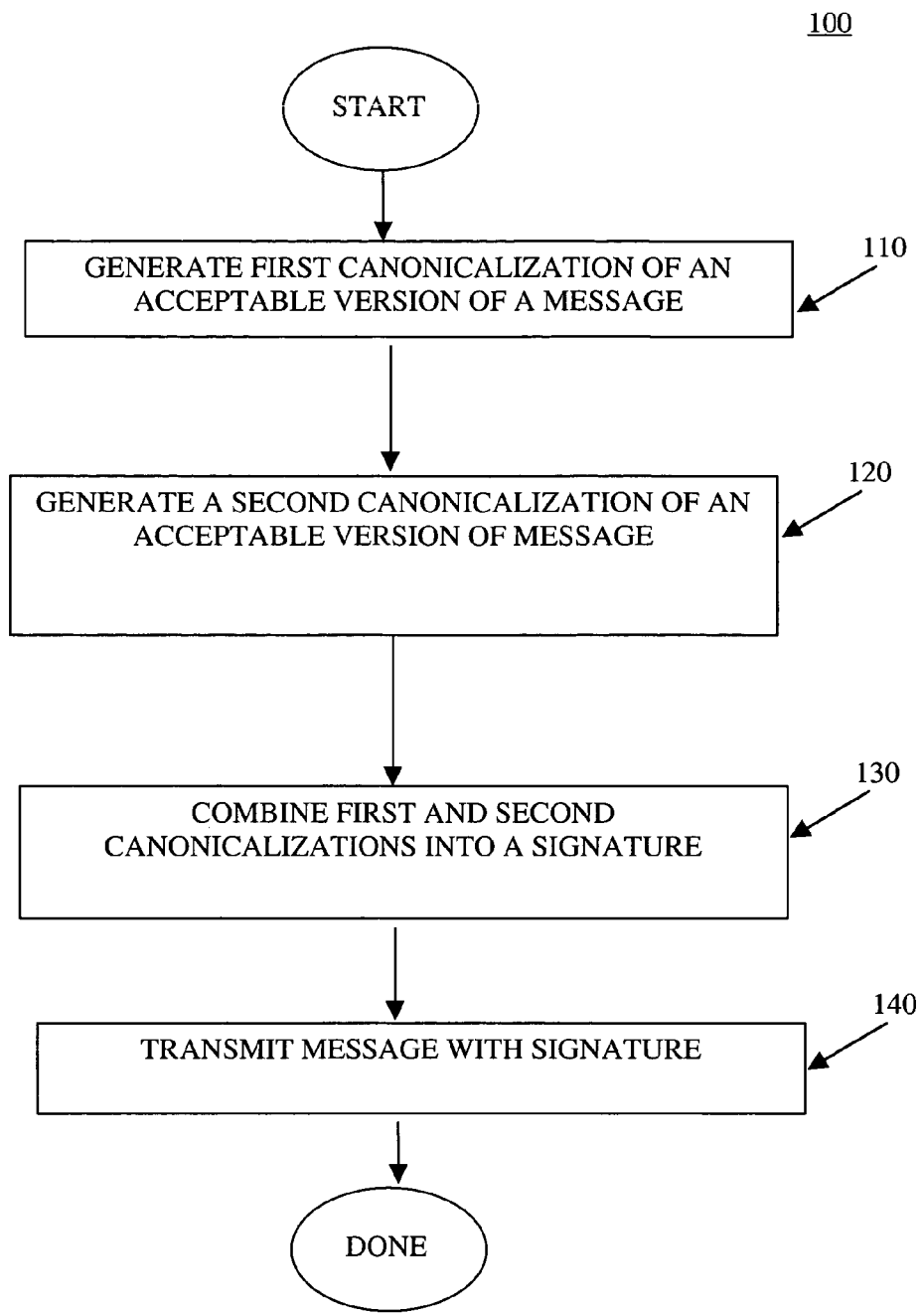
FIG. 1 is a flowchart illustrating one embodiment of a method for generating and sending a digitally signed email message in accordance with the present invention.

In the following detailed description of the present invention, numerous specific details are set forth in order to provide a thorough understanding of the present invention. However, it will be recognized by one skilled in the art that the present invention may be practiced without these specific details or with equivalents thereof. In other instances, well-known methods, procedures and components have not been described in detail as not to unnecessarily obscure aspects of the present invention.

Some portions of the detailed descriptions, which follow, are presented in terms of procedures, steps, logic blocks, processing, and other symbolic representations of operations on data bits that can be performed in computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system or similar electronic computing device (e.g., an intelligent device having computer-like functionality, such as a router or switch). It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "generating" or "transmitting" or "hashing" or "sending" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Aspects of the present invention may be implemented as a computer-usable medium that has computer-readable program code embodied therein. The computer system can include, in general, a processor for processing information and instructions, random access (volatile) memory (RAM) for storing information and instructions, read-only (non-volatile) memory (ROM) for storing static information and instructions, a data storage device such as a magnetic or optical disk and disk drive for storing information and instructions, an optional user output device such as a display device (e.g., a monitor) for displaying information to the computer user, an optional user input device including alphanumeric and function keys (e.g., a keyboard) for communicating information and command selections to the processor, and an optional user input device such as a cursor control device (e.g., a mouse) for communicating user input information and command selections to the processor. The computer system may also include an input/output device for providing a physical communication link between the computer system and a network, using either a wired or a wireless communication interface.

FIG. 1 is a flowchart [100] illustrating a method for generating a digital signature for an email message or other piece of email. The sender intends that there is more than one acceptable version of the contents of the email for which the sender can guarantee the authenticity. Basically, the sender is aware that certain innocuous transformations may take place on the delivery path from the sender to the receiver. Instead of generating a separate signature for each of the acceptable versions of the contents, the sender generates a single signature which includes information regarding the more than one acceptable version of the contents.

Step 110 in flowchart 100 is the transforming of a first version of the an email message to generate a first transformed message. In one embodiment of the present invention, transforming the first version of the message includes generating a first canonicalization of the message using a first hashing function. In one embodiment of the present invention, this step is preceded by the generation of a first acceptable variation of the original contents or subset thereof. A hashing function is then performed on this first alternative variation to generate a first message digest. The resulting hash or message digest is used to generate the first transformed message, e.g. the first canonicalization. In one embodiment, the first transformed message generated in step 110 also includes an indicator as to a hashing method used to create the first transformed message, so that the receiving system can hash the received message using the same or an equivalent hashing function for authentication. For example, the message digest may have been generated with a one-way hash.

Step 120 is transforming a second version of the original contents of the piece of email to generate a second transformed message, in a manner similar to that just described.

In step 130, the first transformed message generated in step 110 and the second transformed message generated in step 120 are combined to form a single digital signature. The piece of email is then transmitted along with this single signature, as depicted in step 140. In one embodiment of the present invention, step 130 is accomplished by concatenating the first canonicalization containing the first transformed message, with the second canonicalization containing the second transformed message. In a preferred embodiment, the single digital signature is produced and encrypted using a private key encryption scheme, for example using RSA (Rivest-Sharmir-Adelman) encryption.

The sender may generate more than just two transformed messages or canonicalizations, depending on the number of acceptable variations for the contents of the email that are being considered. A single digital signature can encrypt many different one-way hashes, and thus can support many different alternative canonicalizations. A single digital signature can be used to transport multiple alternative canonicalizations, such as "all bytes in message," "all bytes in message except white space," etc. A receiver can then run the various canonicalization algorithms and determine if any of them succeed by producing a message digest matching a message digest included in the signature. For a 1024-bit digital signature, approximately five different variations of the contents of the email can be encoded into the same signature.

Figure 2:
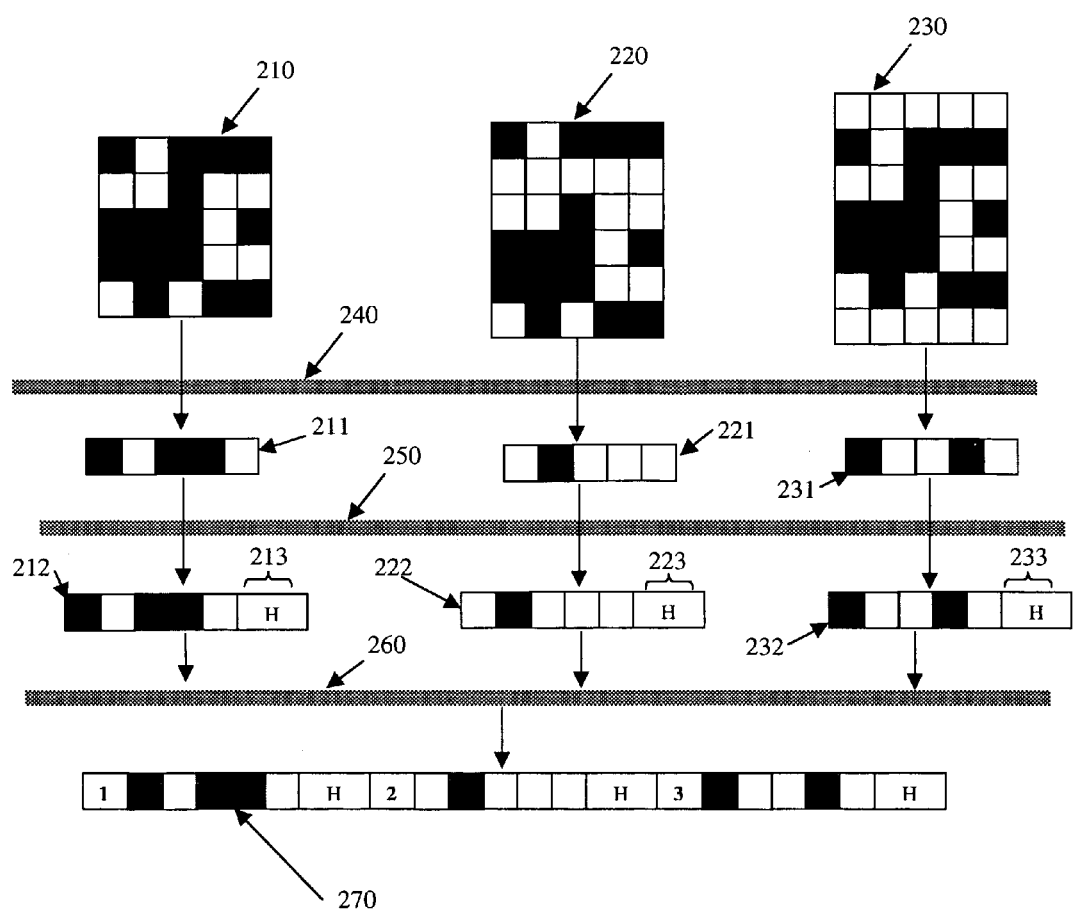
FIG. 2 is a data flow diagram illustrating the derivation of a digital signature according to one embodiment of the present invention.

FIG. 2 is a representation of the derivation of a single signature verifying multiple acceptable versions of the contents of a piece of email. The original contents [210] and acceptable variations of the original contents [220 and 230] are hashed [240] with a hashing function, such as a one-way hash. Each of the original contents [210] and variations [220, 230] can be hashed using a different hashing function. Message digests [211, 221, 231] are thus generated, each based on an acceptable possible transformation of the original contents [210], including the case where no transformation occurs. Each canonicalization [212, 222, 232] contains a message digest [211, 221, 231] and an indicator [213, 223, 233] indicating the canonicalization method employed. The separate canonicalizations [212, 222, 232] are then combined [260]. The result is a single digital signature [270] which contains the separate canonicalizations [212, 222, 232]. In one embodiment of the present invention, the single signature [270] is generated by concatenating the separate canonicalizations [212, 222, 232] and encrypting the result.

Figure 3:
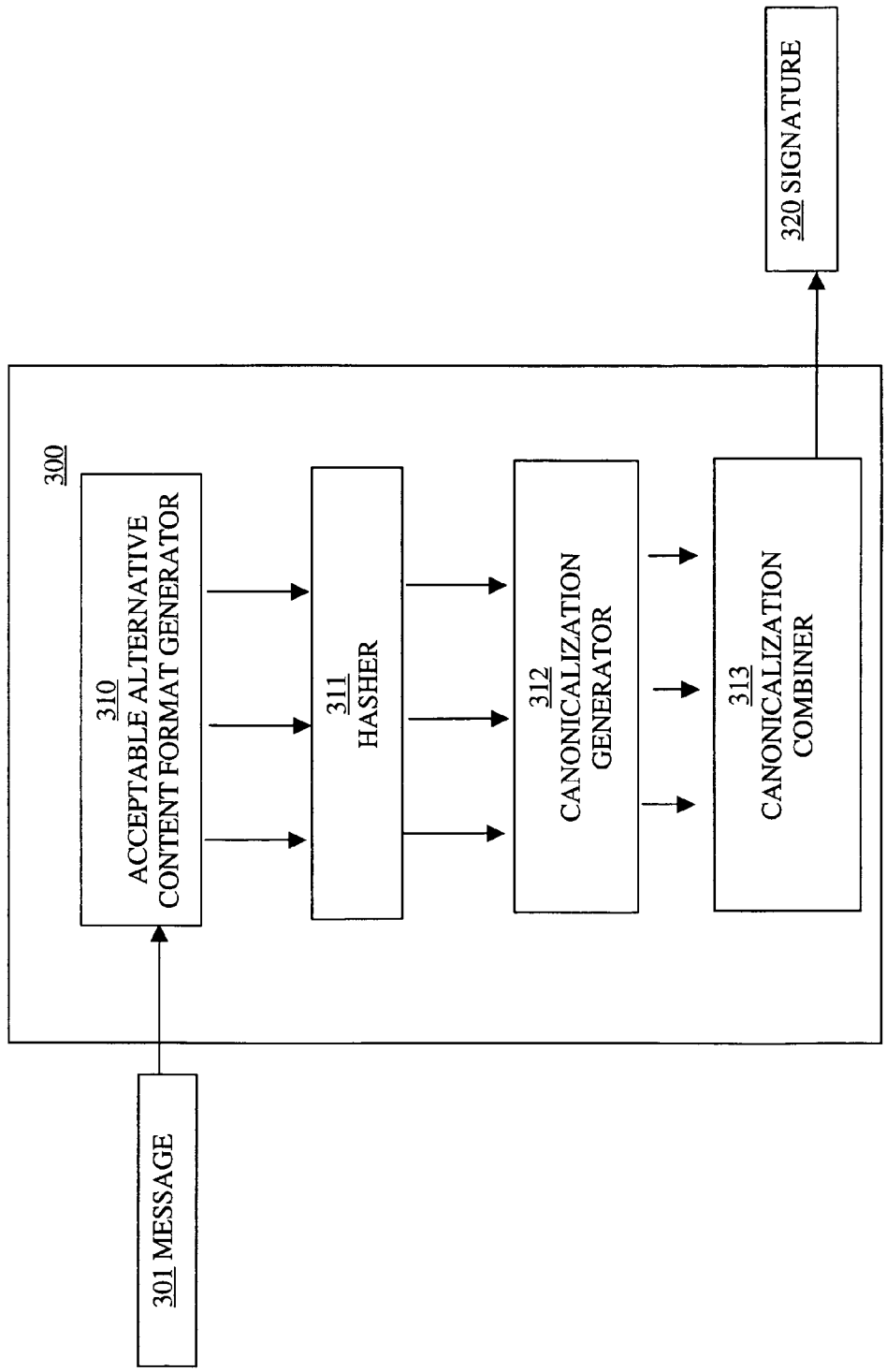
FIG. 3 illustrates a system for generating a digital signature according to one embodiment of the present invention.

FIG. 3 is a representation of a signature generating system [300]. The input of the signature generating system [300] is the message [301]. An acceptable alternative content format generator [310] within the signature generating system [300] receives the message [301] and generates more than one acceptable alternative versions of the contents of the message [301], or a subset thereof. In one embodiment of the present invention, the alternate versions of the contents are generated by an acceptable content format generator situated outside of the signature generating system [300]. The acceptable versions of the contents are then sent to the hasher [311] within the signature generator [300]. The hasher [311] hashes the various acceptable versions of the contents, including the original version, and thus creates one message digest for each acceptable version of the contents. In one embodiment of the present invention, the hashing is performed by a hasher situated outside of the signature generating system [300].

The message digests are passed to a canonicalization generator [312] where they are associated with an indicator that indicates the hashing method employed by the hasher [311]. The combination of the message digest with an associated hashing indicator is referred to herein as a canonicalization, as depicted in FIG. 2.

Continuing with reference to FIG. 3, a canonicalization combiner [313] within or associated with the signature generator [300] combines the various canonicalizations created by the canonicalization generator [312], thereby generating a single digital signature [320] which can guarantee and establish the authenticity of multiple versions of the contents of a piece of email. In one embodiment of the present invention, the canonicalization combiner [313] combines canonicalizations by concatenation and encrypts the signature [320].

Figure 4:
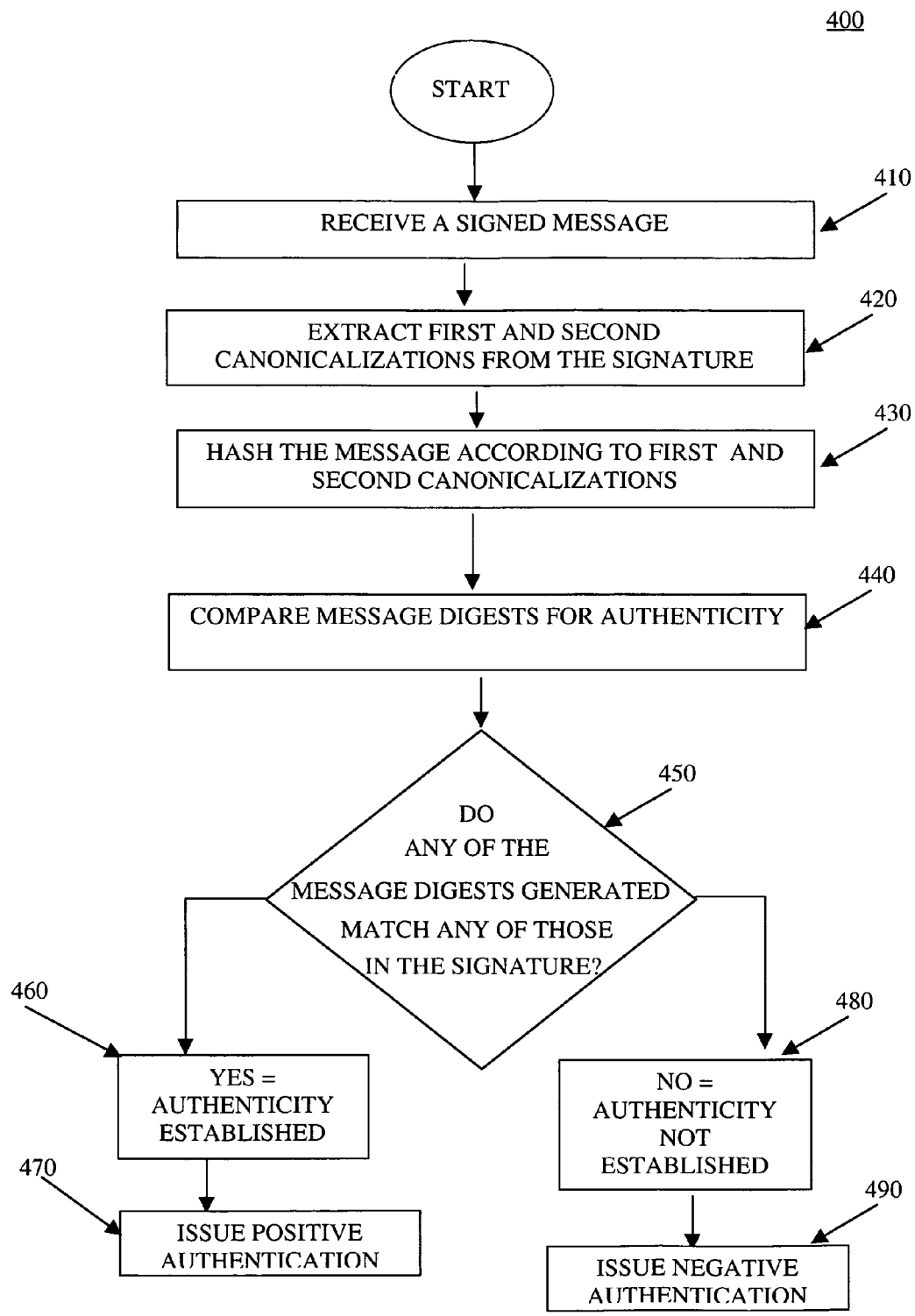
FIG. 4 is a flowchart of one embodiment of a method for receiving and authenticating a signed email message in accordance with the present invention.

FIG. 4 is a flowchart [400] depicting a method for receiving a signed piece of email where the signature accompanying the piece of email contains multiple canonicalizations of the contents of the email. In step 410, a signed message is received and the digital signature is decrypted. First and second canonicalizations are then extracted from the signature, as illustrated in step 420.

In step 430, the contents of the piece of email as received are hashed with the hashing methods indicated in the first and second canonicalizations, to generate a number of message digests based on the contents as received in the email.

In step 440 of flowchart 400, the message digests created in step 430 are compared to the message digests provided by the digital signature. In step 440, a first hash generated by hashing the contents of the email with the hashing method indicated in the first canonicalization is compared with the first message digest extracted from the first canonicalization extracted from the signature [420]. Also in step 440, a second hash generated by hashing the contents of the email with the hashing method indicated in the second canonicalization is compared to the second message digest extracted from the second canonicalization extracted from the signature [420].

Step 450 is the determination of whether any of the hashes generated match any of the message digests extracted from the signature. If the first hash matches the first message digest [460], the authenticity is established, and a positive authentication is issued [470]. If the second hash matches the second message digest [460], the authenticity is established, and a positive authentication is issued [470]. If the first hash does not match the first message digest, and the second hash does not match the second message digest [480], the authenticity is not established, and a negative authentication is issued [490].

Note that the tasks described by steps 440 and 450 can be performed in series. That is, the first hash of the contents of the email can be performed and the results compared to the first message digest provided by the digital signature. If this first comparison is successful, there is no need to perform the succeeding hashes and comparisons. If not successful, then the second hash of the email contents can be performed and the results compared to the second message digest provided by the digital signature, and so on.

In one embodiment of the present invention, there are more than two canonicalizations extracted from the signature in step 420. For example, a typical 1024-bit RSA signature can contain approximately ten canonicalizations. The method illustrated in flowchart 400 can extract and use any number of canonicalizations to verify the authenticity of a piece of email.

In one embodiment of the present invention, different (alternate) canonicalizations may be weighted differently, instead of a simple pass/fail arrangement where a canonicalization is either acceptable or not acceptable. For example, a message where all bytes in the original message were included in the hash is more preferred than a message where there were some transformations, even though that canonicalization succeeded.

Figure 5:
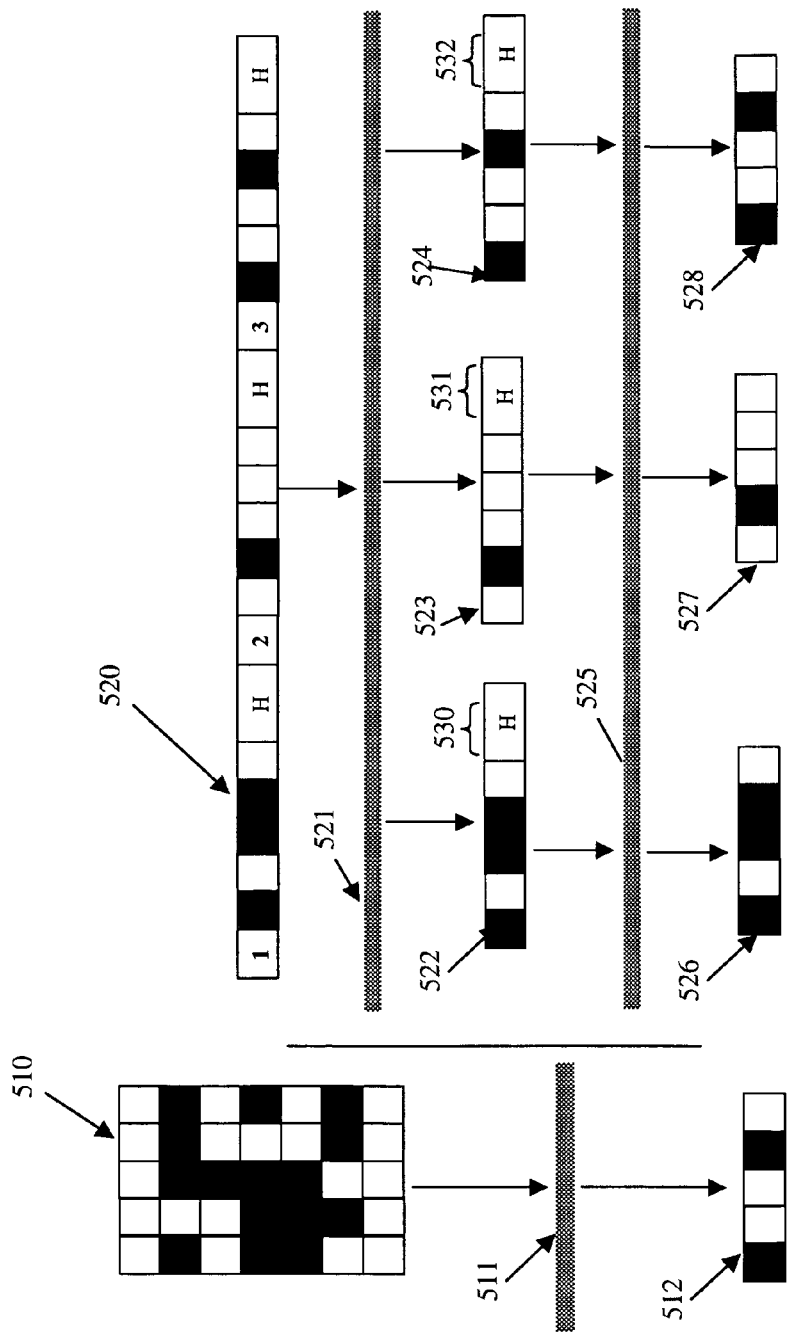
FIG. 5 is a data flow diagram illustrating the authentication of a digitally signed email message according to one embodiment of the present invention.

FIG. 5 is a representation a receiver's authentication of a piece of email. The message [510] received is accompanied by a signature [520]. The signature [520] contains multiple canonicalizations associated with the multiple acceptable version of the contents of the email, as illustrated in FIG. 2.

The receiving system extracts [521] the multiple canonicalizations [522, 523, 524] provided by the signature. Each of the canonicalizations [522, 523, 524] includes a respective message digest [526, 527, 528] and an indication [530, 531, 532] of the hashing method used. The receiving system hashes [511] the contents or a subset thereof of the received piece of email [510] utilizing the hashing method indicated by each of the canonicalizations [522, 523, 524]. If the resulting hash [512] matches any of the message digests [526, 527, 528] extracted from the signature [520], the authenticity of the piece of email is established. If the resulting hash [512] does not match any of the message digests [526, 527, 528], the authenticity of the piece of email is not established.

Figure 6:
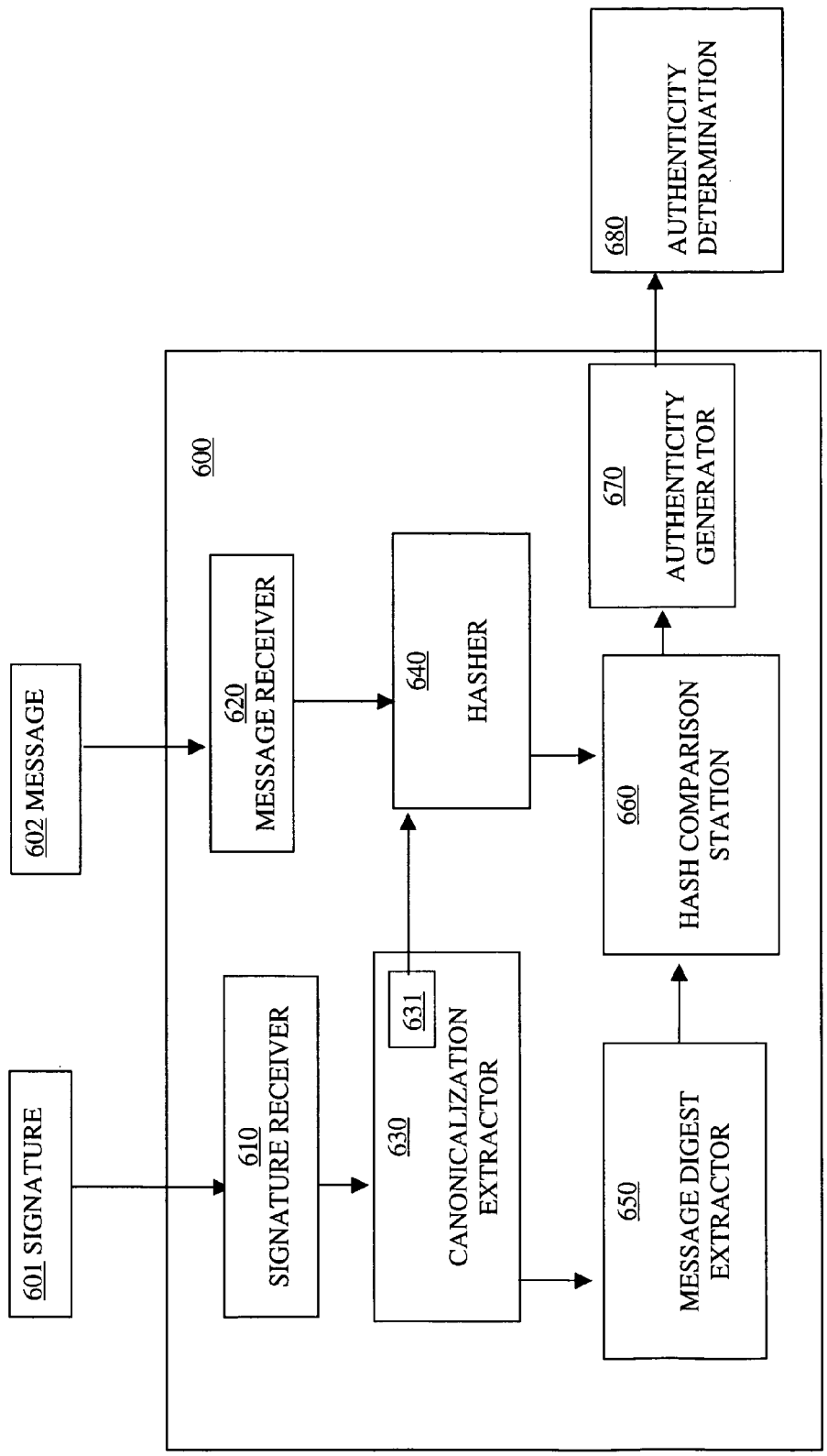
FIG. 6 illustrates a system for authenticating a digitally signed email message according to one embodiment of the present invention.

FIG. 6 is a representation of an email receiving system's authentication system [600]. The signature [601] is received by a signature receiver [610] within the authentication system [600]. A canonicalization extractor [630] extracts any number of canonicalizations from the signature [601]. A hashing method indication extractor [631] further extracts information regarding the hashing method used to generated each message digest extracted by a message digest extractor [650]. A hasher [640] hashes contents of a message [602] received by a message receiver [620]. A hash comparator [660] compares hashes generated by the hasher [640] with respective message digests extracted by the message digest extractor [650]. If any of the hashes generated by the hasher [640] match any of the message digests extracted by the message digest extractor [650], a positive authenticity is indicated by an authenticity generator [670], and a positive indicator [680] is issued. If none of the hashes generated by the hasher [640] match any of the message digests extracted by the message digest extractor [650], a negative authenticity is indicated by the authenticity generator [670] and a negative indicator [680] is issued.

Significant savings in computational costs associated with generating a digital signatures can be realized by sender computer systems utilizing embodiments of the present invention. Generating and transmitting one digital signature containing information regarding multiple canonicalizations is far less computationally expensive than generating and transmitting a single, separate digital signature for each canonicalization. Savings resulting from the utilization of embodiments of the present invention can also be realized by receiving computer systems, in that only one digital signature is received and deciphered.

The foregoing descriptions of specific embodiments of the present invention have been presented for purposes of illustration and description. They are not intended to be exhaustive or to limit the invention to the precise forms disclosed. Many modifications and variations are possible in light of the above teachings. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method comprising:
 transforming a first acceptable version of an original message with a first hash function to generate a first message digest of said first acceptable version;

transforming a second acceptable version of said original message with a second hash function to generate a second message digest of said second acceptable version, wherein said second message digest is different than said first message digest;

generating a first canonicalization comprising said first message digest and a first hash key identifying said first hash function;

generating a second canonicalization comprising said second message digest and a second hash key identifying said second hash function, wherein said second hash function is different than said first hash function;

combining both said first canonicalization and said second canonicalization to generate a single digital signature comprising said first canonicalization and said second canonicalization; and transmitting said digital signature with said original message, wherein said digital signature separately provides for authentication of both said first acceptable version and said second acceptable version of said original message, wherein said first message digest, when said first acceptable version is authenticated by hashing said original message using said first hash function, provides a complete signature for said original message, and wherein said second message digest, when said second acceptable version is authenticated by hashing said original message using said second hash function, provides another complete signature for said original message.

2. The method of claim 1, further comprising generating an nth message digest by transforming an nth acceptable version of said original message to generate an nth canonicalization, wherein said digital signature uses said first, second, through nth canonicalizations.

3. The method of claim 1, wherein combining both said first canonicalization and said second canonicalization comprises concatenating said first and second canonicalizations.

4. The method of claim 1, wherein said original message comprises cleartext.

5. A system comprising:
a hasher for generating a first message digest for a first modified version of an original, complete message using a first hashing function and for generating a second message digest for a second modified version of said complete message using a second hashing function comprising a different algorithm than said first hashing function, wherein said first message digest is generated by hashing a portion of said complete message, and wherein said second message digest is generated by further hashing said portion of said complete message separately from said first modified version of said complete message;

a canonicalization generator configured to generate a first canonicalization comprising said first message digest and a first hashing indicator identifying said first hashing function employed by said hasher, wherein said canonicalization generator is further configured to generate a second canonicalization comprising said second message digest and a second hashing indicator identifying said second hashing function employed by said hasher; and a canonicalization combiner for concatenating said first and second canonicalizations into a single digital signature, wherein said first canonicalization authenticates said complete message when said complete message is hashed using said first hashing function and matches said first message digest, and, wherein said second canonicalization authenticates said complete message when said complete message is hashed using said second hashing function and matches said second message digest, and wherein either of said first and said second canonicalizations provides for an independent authentication of said complete message.

6. The system of claim 5, wherein said hasher generates an nth message digest for an nth modified version of said complete message;
wherein said canonicalization generator generates an nth canonicalization comprising said nth message digest and an nth indication of a hashing function employed by said hasher; and
wherein said canonicalization combiner concatenates said first through nth canonicalizations of said modified versions for said single digital signature.

7. The system of claim 5, further comprising an encryptor for encrypting said concatenated canonicalizations of said modified versions to generate said single digital signature.

8. The system of claim 5, wherein said first modified version and said second modified version, when authenticated, provide multiple copies of said complete message.

9. A system comprising:
means for hashing a first modified version of an original message using a first hashing function to produce a first message digest of said first modified version;
means for generating a first canonicalization comprising said first message digest and a first hashing key indicating said first hashing function;
means for hashing a second modified version of said original message using a second hashing function different than said first hashing function to produce a second message digest of said second modified version of;
means for generating a second canonicalization comprising said second message digest and a second hashing key indicating said second hashing function;
means for generating a single digital signature comprising both said first and second canonicalizations, wherein both said first and second message digests are separately maintained within said single digital signature;
means for transmitting said single digital signature together with said original message; and
means for hashing said original message, wherein said original message is completely authenticated when said original message, hashed using said first hashing function, matches said first message digest, wherein said original message is completely authenticated when said original message, hashed using said second hashing function, matches said second message digest, and wherein said original message is separately authenticated using either of said first or second hashing functions.

10. The system of claim 9, further comprising means for generating an nth canonicalization of an nth message digest of said original message, wherein said single digital signature comprises a concatenation of said first through nth canonicalizations.

11. The system of claim 10, further comprising means for encrypting said concatenated canonicalizations to generate said single digital signature.

12. The system of claim 9, further comprising:
means for extracting said first canonicalization and said second canonicalization from said digital signature;
means for hashing said original message using said first hashing key to generate a first hashed message, wherein said first hashed message is generated after transmitting said original message;
means for comparing said first hashed message with said first message digest;
means for hashing said original message using said second hashing key to generate a second hashed message, wherein said second hashed message is generated after transmitting said original message;
means for comparing said second hashed message with said second message digest; and means for authenticating said original message when a match is found.

13. The system of claim 9,
wherein said first message digest when authenticated, provides a complete signature for said original message, and wherein said second message digest, when authenticated, provides another complete signature for said original message.

14. The system of claim 13, wherein said first canonicalization is preferentially weighted greater than said second canonicalization in authenticating said modified versions.

15. The system of claim 14, wherein said first canonicalization contains fewer transformations of said original message than said second canonicalization.

16. The system of claim 9, wherein said original message comprises electronic mail.

17. A non-transitory computer-readable medium having stored thereon computer-implementable instructions, wherein said instructions are executable by a processor that cause said processor to perform operations comprising:
modifying data associated with an original message as a first modified version;
generating a first message digest of said first modified version using a first hash function;
modifying said data of said original message as a second modified version;
generating a second message digest of said second modified version using a second hash function different than said first hash function, wherein the same data associated with said original message is modified as said second message digest using said second hash function independently of being modified as said first message digest using said first hash function;
generating a first canonicalization comprising said first message digest and a first hash indicator identifying said first hash function;
generating a second canonicalization comprising said second message digest and a second hash indicator identifying said second hash function;
generating a single digital signature comprising both said first and second canonicalizations; and
transmitting said single digital signature with said original message, wherein said single digital signature is configured to authenticate of said original message, wherein said first canonicalization provides a complete authentication of said original message, when said first message digest matches said original message as hashed using said first hash function, and wherein said second canonicalization provides a further complete authentication of said original message, when said second message digest matches said original message as hashed using said second hash function, and wherein said original message is independently authenticated using either of said first or second canonicalizations.

18. The computer-readable medium of claim 17, wherein said operations further comprise generating an nth canonicalization of an nth message digest of said original message, and wherein said single digital signature comprises concatenating said first through nth canonicalizations.

19. The computer-readable medium of claim 18, wherein said operations further comprise encrypting said concatenated canonicalizations to generate said single digital signature.

20. The computer-readable medium of claim 17, wherein said original message is modified by an addition or deletion of blank lines or white spaces in said original message, and wherein said first modified version is identical to said second modified version other than said addition or deletion of said blank lines or said white spaces.

21. A non-transitory computer-readable medium having stored thereon computer-implementable instructions, wherein said instructions are executable by a system that cause said system to perform operations comprising:
receiving an original message of electronic mail together with a single digital signature comprising a first canonicalization and a second canonicalization, wherein said first canonicalization comprises a first hashed version of a modified version of said original message and a first hash indicator identifying a first hashing function, and wherein said second canonicalization comprises a second hashed version of a second modified version of said original message and a second hash indicator identifying a second hashing function;
hashing said received original message using said first hashing function, wherein said received original message is hashed after it is received together with the single digital signature;
authenticating said electronic mail when said received original message, hashed using said first hashing function, matches said first hashed version, wherein said first canonicalization, when authenticated, provides a complete signature of said original message; and
when said received original message does not match said first hashed version, hashing said received original message using said second hashing function to authenticate said electronic mail, wherein said electronic mail is authenticated when said received original message, hashed using said second hashing function, matches said second hashed version, wherein said second hashing function comprises a different algorithm than said first hashing function, and wherein said second canonicalization, when authenticated, provides another complete signature of said original message.

22. The non-transitory computer-readable medium of claim 21, wherein said operations further comprise generating said modified version by deleting blank lines or white spaces in said original message, and wherein said modified version is identical to said received original message.

23. The non-transitory computer-readable medium of claim 22, wherein said original message is modified during transport by the deletion said blank lines or white spaces.

24. The non-transitory computer-readable medium of claim 22, wherein said modified version is identical to said original message other than the deletion of said blank lines or white spaces.

* * * * *